June 26, 1962
G. C. DUNCAN ET AL
3,040,629
MISSILE LAUNCHER
Filed April 11, 1960
2 Sheets-Sheet 1
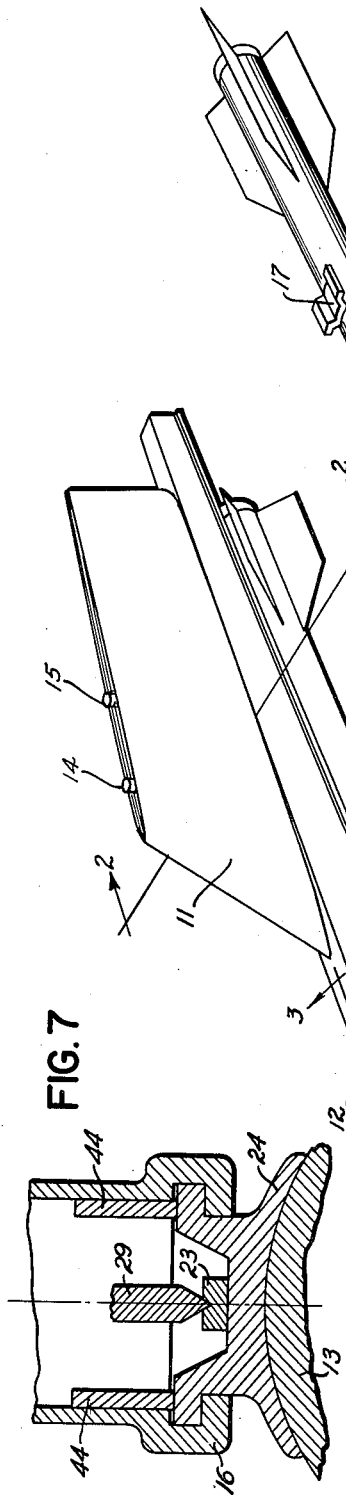
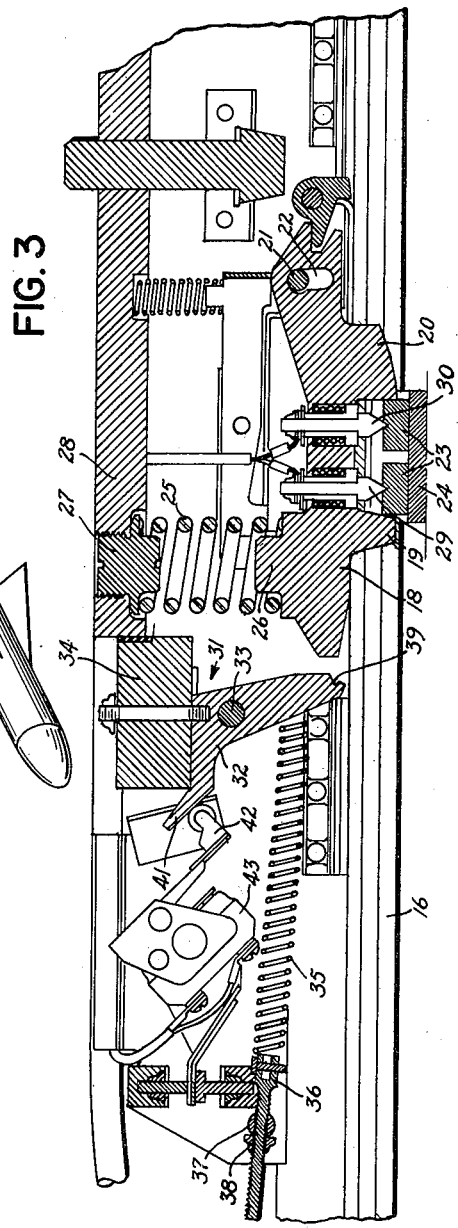
FIG. 6
FIG. 3
FIG. 7
FIG. 1
INVENTORS
GARNETT C. DUNCAN, ALBERT P. REDDING
THOMAS W. LUCERO, WILLIAM WAYNE LEE
BY
*H. H. Losch*
ATTORNEYS INVENTORS
GARNETT C. DUNCAN, ALBERT P. REDDING
THOMAS W. LUCERO, WILLIAM WAYNE LEE
BY

*H. W. Losch*
ATTORNEYS

United States Patent Office 3,040,629
Patented June 26, 1962

3,040,629
MISSILE LAUNCHER
Garnett C. Duncan, Glendale, William W. Lee, Van Nuys, Thomas W. Lucero, Woodland Hills, and Albert P. Redding, Tujunga, Calif., said Redding, assignor, by mesne assignments, to the United States of America as represented by the Secretary of the Navy
Filed Apr. 11, 1960, Ser. No. 21,476
3 Claims. (Cl. 89—1.7)

The present invention relates to a missile launcher, and more particularly to a launcher that is adaptable for carrying a missile in a firing position beneath the wing of an aircraft.

Various devices have been employed for carrying rockets and missiles on the under side of an aircraft wing. The missiles have to be securely attached during airplane takeoff and flight, and yet the launcher has to be equipped so that it will release the missile upon firing. One convenient method of mounting missiles, heretofore employed, has been to support the missile in a U-shaped hanger and to hold the missile by spring or other restraining means. In the case of carrier-based naval aircraft, considerable difficulty has been encountered in preventing dislodgment of the missiles from the planes when concentrated deceleration forces are imparted to the plane by the flight deck arresting gear.

One method employed in the past to restrain the missile has been to use a retaining pawl to resist forward motion of the missile and to hold the pawl by a shear pin of particular strength. The shear pin is designed to hold under the concentrated deceleration forces imparted to the airplane in the course of an arrested landing upon the flight deck of an aircraft carrier, yet is not sufficiently large to prevent the firing of the rocket projectile.

The launcher of the present invention provides a detent unit for holding a missile in both fore and aft directions. The detent unit is also integrated with snubber cams that engage the forward and aft missile lugs and prevent vertical and lateral movement of the missile until fired. An inertia lock is also provided for engaging the detent when there is rapid deceleration of the aircraft, and thus accidental loss of the missile is prevented.

It is, therefore, a general object of the present invention to provide a novel support for a missile that is to be carried under the wing of an aircraft.

Another object of the present invention is to provide an improved missile launcher for safely carrying a missile during aircraft flight and permitting the missile to be readily fired.

Still another object of the present invention is to provide means for preventing accidental dislodgment of the missile in case of rapid deceleration of the airplane carrying the missile.

Other objects and advantages of the present invention will be readily appreciated as the same becomes better understood by reference to the following detailed description when considered in connection with the accompanying drawings wherein:

FIG. 1 is an oblique view showing the missile launcher of the present invention and having a missile attached thereto;

FIG. 3 is a partial sectional view taken on line 3—3 of FIG. 1;

FIG. 6 is an oblique view showing a missile of the type to be carried by the launcher of the present invention; and FIG. 7 is a partial sectional view showing forward snubber cams engaging a forward lug.

Figure 2:
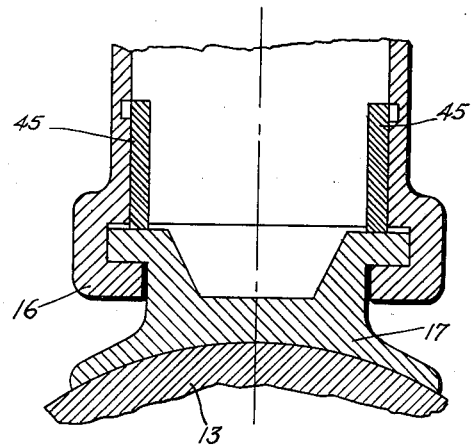
FIG. 2 is a partial sectional view taken on line 2—2 of FIG. 1.

Referring now to the drawings, there is shown in FIG. 1, a missile launcher comprised of a pylon assembly 11 and a launcher frame 12. A missile 13 is shown attached to the launcher frame in a position that it would be carried in beneath the wing of an aircraft. The pylon assembly consists essentially of a one-piece structural member enclosed in a streamlined fairing. Two posts 14 and 15 are provided which engage with aircraft wing fittings to mount the pylon to an aircraft wing.

Referring now to FIGS. 2, 3, 6, and 7 of the drawings, it can be seen that a launcher track 16 is provided for slidably engaging the lugs 17 and 24 on a missile. FIG. 2 of the drawings shows an aft lug 17 positioned in the launcher track 16 and FIG. 7 shows a forward missile lug 24 positioned in the launcher track 16. After the missile lugs are slidably engaged in the launcher track, it is necessary that the missile be secured so that it will not leave the launcher until fired. A detent assembly is provided for locking the missile in position, and additionally, snubbers engage the forward and aft missile lugs and prevent vertical and lateral movement of the missile until fired.

A detent assembly is shown in FIG. 3 of the drawings. A detent 18, having a forward projection 19 and a rear projection 20, is pivotally mounted by means of pin 21 that passes through slot 22. It can be seen that the projections 19 and 20 extend downwardly beyond two contact buttons 23 which are part of a forward missile lug 24, and restrain the missile 13 from horizontal movement. The detent 18 is maintained in a downward or locked position by a spring 25 that is seated around a boss 26 on the forward portion of detent 18. A screw 27 is threadedly engaged with the top frame 28 and provides a seat for spring 25. This screw 27 is used to adjust the tension on detent 18. A pair of strikers 29 and 30 are attached to the detent 18 and these strikers are spring biased against the contact buttons 23 so that an electrical connection can be made between the launcher frame 12 and the missile 13.

The thrust of the missile during firing is great enough so that the missile overrides the restraining effect of the detent and moves forward along the rails of the launcher assembly. In order to prevent accidental release of the missile in case of rapid deceleration of the airplane, an inertia lock 31 is provided. An L-shaped arm 32 is pivotally mounted on pin 33 and a weight 34 is attached to the top of the arm 32. A spring 35 is attached to the lower leg of the L-shaped arm 32 and biases the inertia lock away from the detent 18. The other end of spring 35 is connected to a fork 36 that has one end threaded and secured to pin 37. A nut 38 is threadedly engaged with the threaded end of fork 36, and is used to adjust the amount of tension desired in spring 35. The lower leg of arm 32 is provided with a notch 39 that is engageable with detent 18 to prevent the detent from raising and releasing the missile 13 when the weight 34 has pivoted forward.

A top leg 41 is provided on the L-shaped arm 32 and this leg engages an actuator 42 of a switch 43. This switch 43 is connected in circuit with the firing relay and jettison relay of the missile and when the switch is actuated the ground circuits of both relays are opened, thus preventing the accidental firing of the missile while the inertia lock 31 is engaged with the detent 18.

Figure 4:
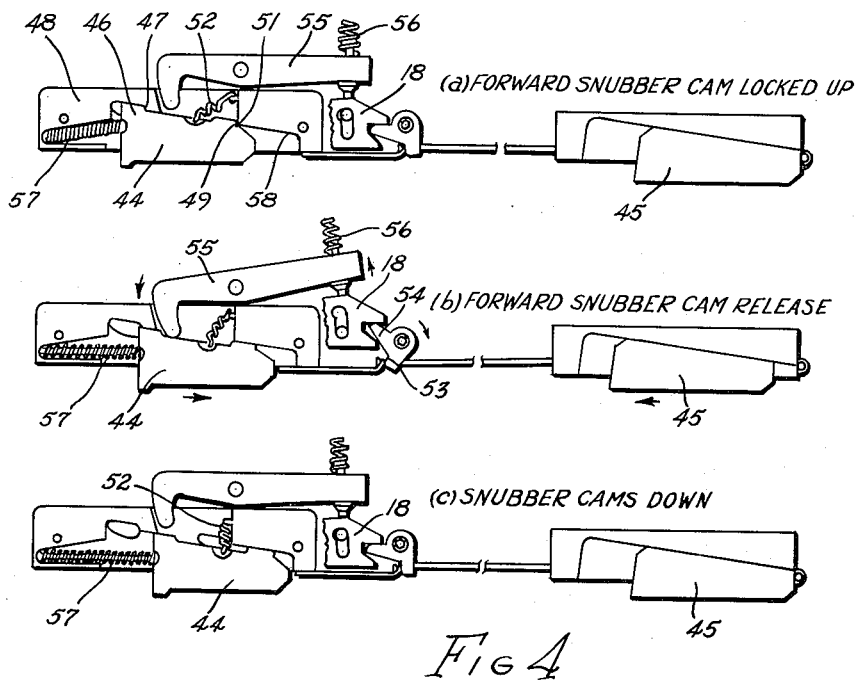
FIG. 4 shows a sequence of operations of a snubber assembly.

Snubber cams are provided to hold the missile 13 tightly to the rail and thus prevent sway and lateral movement of the missile. A pair of forward snubber cams 44 are provided for engaging the forward lug 24 on the missile and a pair of aft snubber cams 45 are provided for engaging the aft lug 17. FIG. 4(a) shows a forward snubber cam 44 in a locked-up position. A flange 46 on the snubber cam 44 engages a lip 47 in guide block 48 and also the top edge 49 of snubber cam 44 is in contact with edge 51 in the guide block. A spring 52 maintains the snubber cam 44 in this position until released.

Figure 5:
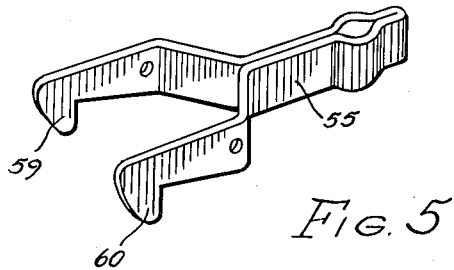
FIG. 5 is an oblique view showing the details of a release arm.

FIG. 4(b) shows the forward snubber cam 44 being actuated. The release can be accomplished by engaging a hexagonal wrench in latch 53 and rotating latch 53 in a clockwise direction. The tang 54 of latch 53 will raise detent 18 and in turn pivot release arm 55. Release arm 55 is biased against detent 18 by spring 56. When the aft end of detent 18 is raised by latch 53, the force of spring 56 is overcome and release arm 55 is pivoted against the top of the forward snubber cams 44 and moves the cams 44 away from lip 47 and edge 51. When the cams 44 are cleared from these retaining lips and edges, spring 57 moves the forward snubber cam in an aft direction. As guide block 48 has a tapered guide surface 58, the forward snubber cam moves in a downward direction as it travels in an aft direction. As can be seen in FIG. 5 of the drawings, release arm 55 is comprised of legs 59 and 60, so that both forward snubber cams 44 can be actuated simultaneously.

FIG. 4(c) shows the forward snubber cam 44 and the aft snubber cam 45 in a down position that they would be in when a missile is loaded. Upon firing of the missile, the forward motion of the missile will move the forward snubber cams 44 in a forward direction, compressing spring 57, and spring 52 will cause the cam 44 to be locked up. This permits the aft lug 17 to clear the missile launcher without having to strike or engage the forward snubber cams. Also, upon firing of the missile, detent 18 is raised which causes latch 53 to be pivoted, as tang 54 of latch 53 engages a notch in detent 18. As the aft snubber cams 45 are connected by tie rods to latch 53, clockwise rotation of latch 53 causes the aft snubber cams to be moved forward and upward, and thus remove the pressure from the aft lug 17.

In operation, the launcher and pylon are attached to a wing of an airplane by means of posts 14 and 15. The launcher and pylon, when connected to an airplane, provide a complete launching system for a specific air-to-air guided missile or a suitably configured target rocket. The launcher supports and retains the missile or target rocket until fired.

The missile 13 is loaded onto the launcher assembly 12 by engaging missile lugs 24 and 17 with track 16. The forward missile lug 24, during loading, engages the rear projection 20 of detent 18, and as this projection 20 has a tapered under surface, the detent 18 is raised, and buttons 23 are passed into position. The forward projection 19 positions the buttons and the rear projection 20 then drops down behind the buttons 23. Slot 22 permits the raising and lowering of detent 18. When the aft end of detent 18 is raised, release arm 55 is actuated and in turn the forward snubber cams 44 are released from their locked-up position and engages the forward missile lug 24. Electrical connection is made between the launcher assembly and missile by means of strikers 29 and 30 that engage buttons 23.

The missile 13 is prevented from longitudinal movement by the projections 19 and 20 on detent 18. Upon firing the missile, the force exerted upon the forward projection 19 is very large, and the downward force of spring 2 is overcome and the detent 18 is pivoted about pin 21 The forward end of detent 18 is raised and the missil is permitted to leave the launcher. The forward snubbe cams 44 are also moved forward by the travel of the mi sile and the cams are locked-up by means of flange 4 edge 51, and spring 52. The aft lug 17 on the missile 1 can then pass beneath the detent 18 without striking c touching the forward snubber cams.

In the event of sudden deceleration of the aircraft, suc as that caused by making a landing on the flight deck c a carrier, the inertia lock 31 is actuated to prevent di lodgment of the missile 13. The sudden deceleration wi cause the L-shaped arm 32 to be pivoted forward, du to the large mass of weight 34, and notch 39 will enga detent 18 and prevent it from raising. As long as th L-shaped arm 32 is pivoted forward, switch 43 will t actuated and the electrical circuits to the missile motc will be opened.

It can thus be seen that the present invention provid a novel method of carrying a missile beneath the win of an airplane and that the missile can be safely launche while in flight. The device of the present invention als provides safety means for automatically locking the mi sile in the launcher in the event of sudden deceleratic of the airplane.

Obviously many modifications and variations of th present invention are possible in the light of the abov teachings. It is, therefore, to be understood that the ii vention may be practiced otherwise than as specificall described.

What is claimed is:

1. A device for attaching a missile to an airplane con prising: a launcher frame having first and second pai of opposed tapered guide surfaces and having guide rai adaptable for slidably engaging the forward and aft lu on a missile, a detent pivotally attached to said launch frame for releasably securing said missile in a fore an aft direction, spring means biasing said detent in a dow ward direction, a first pair of snubber cams slidab mounted one each in said first pair of opposed taperc guide surfaces for engaging said forward lug on said mi sile, a second pair of snubber cams slidably mounted o each in said second pair of opposed tapered guide su faces for engaging said aft lug on said missile, means f locking said first pair of snubber cams in an upward pos tion whereby said aft lug can slidably pass below said fir pair of snubber cams, and means attached to said launch frame for preventing release of said missile when sai airplane is subjected to rapid deceleration.

2. A device for attaching a missile to an airplane : set forth in claim 1 wherein means attached to sa launcher frame for preventing release of said missile whe said airplane is subjected to rapid deceleration compris an arm pivotally attached to said launcher frame an adaptable for engaging said detent, spring means biasir said arm from said detent, and a weight attached to sa arm whereby upon sudden deceleration the inertia of sa weight causes said arm to pivot and engage said deten 3. A device for attaching a missile to an airplane con prising: a launcher frame having first and second pai of opposed tapered guide surfaces and having guide rai adaptable for slidably engaging the forward and aft lu on a missile, a detent pivotally attached to said launch frame for releasably securing said missile in a fore an aft direction, spring means biasing said detent in a dow ward direction, a first pair of snubber cams slidab mounted one each in said first pair of opposed taperc guide surfaces for engaging said forward lug on sa missile, a second pair of snubber cams slidably mount one each in said second pair of opposed tapered guic surfaces for engaging said aft lug on said missile, mea for locking said first pair of snubber cams in an upwa position whereby said aft lug can slidably pass belo said first pair of snubber cams, an arm pivotally attache to said launcher frame and adaptable for engaging said detent, spring means biasing said arm from said detent, and a weight attached to said arm whereby upon sudden deceleration the inertia of said weight causes said arm to pivot and engage said detent.

References Cited in the file of this patent

UNITED STATES PATENTS

| | | |
|---|---|---|
| 2,422,660 | Elder et al. | June 24, 1947 |
| 2,460,929 | Goff | Feb. 8, 1949 |
| 2,732,003 | Williams | Jan. 24, 1956 |
| 2,771,811 | Lauritsen | Nov. 27, 1956 |
| 2,817,272 | Gunder | Dec. 24, 1957 |
| 2,826,444 | Kurilenko | Mar. 11, 1958 |
| 2,826,960 | Schiavi | Mar. 18, 1958 |
| 2,930,288 | Jonah | Mar. 29, 1960 |